(12) United States Patent
Jaeger et al.

(10) Patent No.: US 11,354,103 B2
(45) Date of Patent: *Jun. 7, 2022

(54) LOAD MODULE COMPILER

(71) Applicant: LzLabs GmbH, Wallisellen (CH)

(72) Inventors: Jan Jaeger, Ruschlikon (CH); Thomas D. Grieve, Romsey (GB)

(73) Assignee: LzLabs GmbH, Wallisellen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/920,998

(22) Filed: Jul. 6, 2020

(65) Prior Publication Data

US 2020/0394029 A1 Dec. 17, 2020

Related U.S. Application Data

(63) Continuation of application No. 16/121,170, filed on Sep. 4, 2018, now Pat. No. 10,713,024, which is a continuation of application No. PCT/IB2016/051415, filed on Mar. 11, 2016.

(51) Int. Cl.
*G06F 8/53* (2018.01)
*G06F 8/52* (2018.01)
*G06F 8/41* (2018.01)
*G06F 8/76* (2018.01)

(52) U.S. Cl.
CPC .............. *G06F 8/53* (2013.01); *G06F 8/447* (2013.01); *G06F 8/47* (2013.01); *G06F 8/52* (2013.01); *G06F 8/76* (2013.01)

(58) Field of Classification Search
CPC ..... G06F 8/40; G06F 8/41; G06F 8/47; G06F 8/447; G06F 8/53; G06F 8/76

USPC .................................................. 717/136–161
See application file for complete search history.

(56) References Cited

U.S. PATENT DOCUMENTS

| | | | |
|---|---|---|---|
| 6,071,317 A | 6/2000 | Nagel | |
| 6,091,897 A | 7/2000 | Yates et al. | |
| 6,662,361 B1 | 12/2003 | Jackson | |
| 7,584,461 B2 | 9/2009 | Plum | |
| 7,765,539 B1 | 7/2010 | Elliott et al. | |
| 8,839,191 B2 | 9/2014 | Ota et al. | |
| 9,335,982 B1 | 5/2016 | Morgan | |
| 2005/0097535 A1 | 5/2005 | Plum | |
| 2009/0106744 A1 | 4/2009 | Li et al. | |
| 2010/0274755 A1 | 10/2010 | Stewart | |
| 2013/0086596 A1 | 4/2013 | Ota et al. | |

OTHER PUBLICATIONS

Examination Report No. 1 for Australian Application No. 2016396782 dated Mar. 16, 2021, 5 pages.
Emmerik, M. V., and Trent Waddington. "Using a decomplier for real-world source recovery." *Reverse Engineering, 2004. Proceedings. 11th Working Conference on.* IEEE, 2004; 10 pages.
International Preliminary Report on Patentability for PCT Application No. PCT/IB2016/051415, dated Sep. 20, 2018; 10 pages.

(Continued)

*Primary Examiner* — Geoffrey R St Leger
(74) *Attorney, Agent, or Firm* — Seed IP Law Group LLP

(57) ABSTRACT

The disclosure invention provides a method for executing a program compiled for a source architecture on a machine having a different target architecture, a non-transitory computer readable medium configured to store instructions for performing such a method, and a system for performing such a method.

21 Claims, 5 Drawing Sheets

(56) References Cited

OTHER PUBLICATIONS

PCT International Search Report and Written Opinion of International Application No. PCT/IB2016/051415, 16 pages, dated Oct. 5, 2016.

Bor-Yeh Shen et al. "A Retargetable Static Binary Translator for the ARM Architecture" ACM Transactions on Architecture and Code Optimization, Association for Computing Machinery, 25 pages, Jun. 1, 2014.

Zhang, X., Gao, X., Guo. Q., Huang, J., Liu, H., & Meng, X. (Nov. 2013), VBIW: Optimizing Indirect Branch in Dynamic Binary Translation. In *2013 IEEE 10th International Conference on High Performance Computing and Communications & 2013 IEEE International Conference on Embedded and Ubiquitous Computing* (pp. 1456-1462). IEEE.

```
MOD_DATA    (    "\x47\xF0\xF0\x28\x00\xC3\xC5\x00\x02\x28\x00\x00\x00\x14"
/* 000010 */     "\x47\xF0\xF0\x01\x98\xCE\xAC\x00\x00\xB6\x00\x00\x00\x00"
/* 000020 */     "\x00\x00\x00\x00\x00\x00\x90\xEC\xD0\x0C\x41\x10\xF0\x38"
: :
/* 001BE0 */     "\x50\xA8\x32\x46\x58\x52\x00\x0C\xD2\x9F\x50\x00\x32\xB2\x98\xEC"
/* 001BF0 */     "\xD0\x0C\x07\xFB");
```

FIG. 3

```
MOD_RLD4(   0x000018   ,    0x000038   ,   0x000044   ,
            0x000048   ,  /*0x00004C*/   0x000054   ,   0x0000C6   ,

```
MOD_LBL(&&start, &&lzIndex3, &&lzIndex4, &&lzIndex5,
        &&lzIndex6, &&lzIndex7, &&lzIndex8, &&lzIndex9, &&lzIndex58, &&lzIndex59, &&lzIndex60, &&lzIndex61,
);
: :
```

FIG. 5

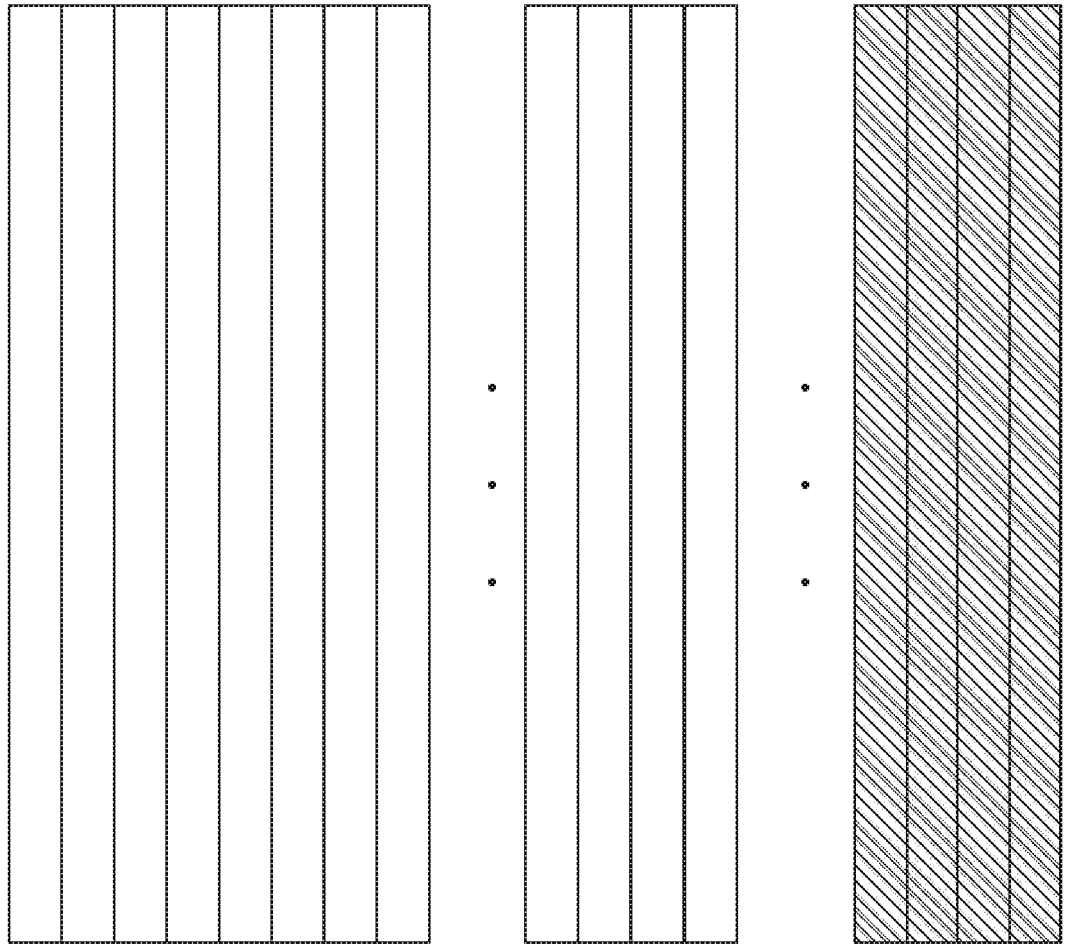

LOAD MODULE COMPILER

CROSS-REFERENCE TO RELATED APPLICATIONS

The present application is a continuation of U.S. patent application Ser. No. 16/121,170 filed Sep. 4, 2018, which is a continuation of PCT International Application No. PCT/IB2016/051415 filed Mar. 11, 2016, the contents of which are incorporated in their entirety herein.

TECHNICAL FIELD

The present invention relates to techniques and systems for executing a program compiled for a source architecture on a machine having a different target architecture.

BACKGROUND

A decompiler is a program that reverses the process of a compiler which translates a computer program written in a high-level, typically human-readable language into a machine language program. In other words, a decompiler takes as input a program written in machine language, and translates that program into an equivalent program written in a higher-level language. A decompiler can be used to create a source code file that may be edited by a programmer and subsequently recompiled, or cross compiled for execution on a platform having a different machine architecture. However, decompilation does not produce source code that is identical to the original source code from which the machine language code or object code was originally generated. In particular, where optimizing compilers have been used to improve executable performance, information is frequently lost which cannot be fully recovered using a decompiler. Additionally, decompiling object code is complicated because it is difficult to separate computer code from data. Nevertheless, decompilation has found applications in algorithm extraction and analysis, in malware detection, and, to a limited degree, for source code recovery for purposes of modifying or translating object code from one environment to another.

A disassembler receives as input an executable program and converts that program into a machine independent assembly code representation. Assembly language typically has a one-to-one correspondence between assembly instructions and underlying machine instructions. A disassembled program can be reassembled by an assembler into an executable program.

In the case of interdependent software programs, translating code from one computer architecture to another typically introduces changes that break interfaces between previously interoperable programs. For example, in the case of call back programs that pass as parameters the addresses of routines or functions to allow a receiving program to invoke a routine in a calling program, translation through decompilation and recompilation to a different target architecture will typically change the addresses, and may change the size of address operands, so as to disrupt the ability of the receiving program to invoke the remote routine.

External references are references within a computer program or routine to some code or data that is not declared within that program or routine. Typically, external references in one program are identifiers that are declared in code that is compiled separately from the first program. In the event that a computer program that uses external references is decompiled and subsequently recompiled on another target architecture, the external references will not operate if the target architecture uses a different addressing scheme than the original architecture. For example, if a program that used external addresses is initially compiled to run on a 32 bit machine, the machine code for that program will use 32 bit addresses. If addresses to program code compiled for such a 32 bit machine are passed to other programs as external references, the receiving program must also be designed to receive and make use of 32 bit addresses. In the event that the calling program is recompiled for a 64 bit machine, the external references will no longer function correctly.

A load module refers to all or part of an executable program, typically in the context of a legacy, mainframe computing environment. A compiler, such as the a Cobol compiler, translates a source code program made up of one or more source code files into object code including one or more machine language program files. These object code files, in some cases together with additional object files, can be linked and assembled into an executable program. Such an executable program is constrained to run only on a processor of a specific architecture and instruction set. Typically, a processor of a given architecture has associated with its architecture an instruction set. Processors having different architectures support different instruction sets, with the result that an executable program including machine instructions of one instruction set will not generally execute on a processor having a different architecture and different corresponding instruction set.

A load module compiler that could receive as input, a compiled legacy load module such as a Cobol load module compiled for a System 390 mainframe, and that could generate as output an executable program that could run on a 64 bit x86 platform while continuing to make external references accessible would enable the migration of mainframe computing jobs to a non-mainframe environment without rewriting and/or recompiling the original Cobol source code.

SUMMARY

The present invention, according to a first embodiment, relates to a computer implemented method for executing a first program compiled for a source architecture on a machine having a target architecture different from the source architecture. The method includes receiving by a processor the first program including first executable code compiled to execute on a source architecture, decompiling by a decompilation module executing on the processor the load module into intermediate computer code formatted according to an intermediate code format, identifying by the decompilation module the set of addresses that are exposed for external reference by a second program compiled to execute on the source architecture, and storing in a computer memory an index of the addresses that are exposed for external reference. The index values correspond to a range of invalid addresses in the target architecture. The method further includes recompiling by a compiler module, the intermediate code into target executable code configured for the target architecture. The compiler module incorporates the index of the addresses into the target executable code. Finally the method includes executing the target executable code on a processor having the different target architecture. Executing generates at least one invalid address and an exception handler translates the invalid address into a valid address using the incorporated index.

According to further embodiments, which may be used in combinations with one another and the first embodiment, the invention also includes a method in which: receiving by a processor a first program is performed by a processor of the source architecture; receiving by a processor the first program is performed by a processor of the target architecture; recompiling by a compiler module is performed on a second processor of the target architecture; intermediate code formatted according to an intermediate code format invokes an input output macro; the compiler module inserts one or more instructions into the target code to determine that a branch target is directed to an invalid address and instructions to replace such invalid address with a valid address at runtime using the incorporated index; the set of addresses that are exposed for external reference are 32-bit addresses and the at least one address according to the target architecture is a 64-bit address; the first program is a relocatable Cobol load module; the intermediate code formatted according to an intermediate code format includes a set of C program macros; the identifying by the decompiler module the set of addresses that are exposed for external reference includes, in a first pass by the decompiler module, examining the syntax of the instructions in the machine code of the first program, determining from the syntax of the instructions that a set of symbols are addresses, and adding the symbols to the index; the identifying by the decompiler module the set of addresses that are exposed for external reference further includes identifying parameters in the machine code including the first program whose calculation indicates that the parameters are addresses within a range of addresses allocated to the first program, and adding the symbols corresponding to each such parameter to the index; the identifying by the decompiler module the set of addresses that are exposed for external reference further includes identifying symbols located in the external symbol directory, and adding the symbols corresponding to such symbols to the index; and the identifying by the decompiler module the set of addresses that are exposed for external reference further includes identifying symbols located in the relocation directory, and adding the symbols corresponding to such symbols to the index.

According to a second embodiment, the invention provides a non-transitory computer readable medium configured to store instructions. The instructions when executed by one or more processors cause the one or more processors to execute a first program compiled for a source architecture on a machine having a target architecture different from the source architecture by performing steps including receiving by a processor the first program including first executable code compiled to execute on a source architecture, decompiling by a decompilation module executing on the processor the load module into intermediate computer code formatted according to an intermediate code format, identifying by the decompilation module the set of addresses that are exposed for external reference by a second program compiled to execute on the source architecture, storing in a computer memory an index of the addresses that are exposed for external reference, wherein the index values correspond to a range of invalid addresses in the target architecture, recompiling by a compiler module, the intermediate code into target executable code configured for the target architecture, wherein the compiler module incorporates the index of the addresses into the target executable code, and executing the target executable code on a processor having the different target architecture. Executing generates at least one invalid address and an exception handler translates the invalid address into a valid address using the incorporated index.

According to further embodiments, which may be used in combinations with one another and the second embodiment, the invention also includes instructions in which, when executed: the intermediate code formatted according to an intermediate code format invokes an input output macro; the compiler module inserts one or more instructions into the target code to determine that a branch target is directed to an invalid address and instructions to replace such invalid address with a valid address at runtime using the incorporated index; the set of addresses that are exposed for external reference are 32-bit addresses and the at least one address according to the target architecture is a 64-bit address; the first program is a relocatable Cobol load module; the intermediate code formatted according to an intermediate code format includes a set of C program macros; identifying by the decompiler module the set of addresses that are exposed for external reference includes, in a first pass by the decompiler module, examining the syntax of the instructions in the machine code of the first program, determining from the syntax of the instructions that a set of symbols are addresses, and adding the symbols to the index; identifying by the decompiler module the set of addresses that are exposed for external reference further includes identifying parameters in the machine code including the first program whose calculation indicates that the parameters are addresses within a range of addresses allocated to the first program, and adding the symbols corresponding to each such parameter to the index; identifying by the decompiler module the set of addresses that are exposed for external reference further includes identifying symbols located in the relocation directory, and adding the symbols corresponding to such symbols to the index. All methods described above may also be used with the non-transitory computer readable medium.

According to a third embodiment, the invention provides a system for executing a first program compiled for a source architecture on a machine having a target architecture different from the source architecture. The system includes a first platform including one or more processors of a source architecture and a decompilation module installed on the first platform and configured to execute on a processor of the one or more processors of the source architecture. The decompilation module is adapted to receive the first program including first executable code compiled to execute on a source architecture, decompile the load module into intermediate computer code formatted according to an intermediate code format, identify the set of addresses that are exposed for external reference by a second program compiled to execute on the source architecture and store in a computer memory an index of the addresses that are exposed for external reference. The index values correspond to a range of invalid addresses in the target architecture. The system also includes a second platform including one or more processors of a target architecture. The second platform is coupled to the first platform through a computer network. The system further includes a compilation module installed on the second platform adapted to execute on a processor of the target architecture, the compilation module adapted to receive the intermediate computer code and the index generated by the decompilation module, to compile the intermediate code into an executable program including machine code of the target architecture, and to incorporate the index into the executable program of the target architecture. The system additionally includes an interrupt handler installed on the second platform wherein, in response to detection by a processor of the second platform of the execution of an instruction to access an invalid address, the exception handler translates the invalid address into a valid address using the incorporated index. The system may further include a non-transitory computer readable medium as described above and may perform a method as described above.

BRIEF DESCRIPTION OF THE DRAWINGS

For a more complete understanding of embodiments of the present invention and its features and advantages, reference is now made to the following description, taken in conjunction with the accompanying drawings, in which:

FIG. 3 is a macro generated while performing a method according to FIG. 2 on a system according to FIG. 1;

FIG. 4 is another macro generated while performing a method according to FIG. 2 on a system according to FIG. 1;

FIG. 5 is still another macro generated while performing a method according to FIG. 2 on a system according to FIG. 1;

FIG. 7 is a schematic diagram of a bit space in a system according to FIG. 1 for which there are fewer than 16 k addresses that are potentially externally referenced, such that external memory references are to addresses ranging from 0000 0000 0000 0000x to 0000 0000 0000 3000x.

DETAILED DESCRIPTION

In accordance with one aspect of the invention, a load module decompiler is provided that is operable to receive as input, a relocatable load module previously compiled to run on a 32-bit mainframe computer, and to generate as output, an executable program compiled to run on a 64-bit computer. By selecting input executable programs that are not self-modifying and whose data and instructions can be separated because the operation of the compiler and its settings are known to separate data and instructions, it is possible to design a decompiler that will translate the input executable, program into a source format that may subsequently be compiled to run on a processor supporting a different instruction sets. Cobol load modules compiled using a Cobol compiler are an example of such programs. To preserve interoperability with other programs that externally reference addresses of the original program, a load module compiler generates an index of addresses that may potentially be referenced from outside the program, and generates as output object code that incorporates 32-bit index locations in lieu of 64-bit addresses for those addresses. In operation, the runtime environment provides an exception handler to translate 32-bit index locations into the correct 64-bit memory addresses for the indexed locations.

Figure 1:
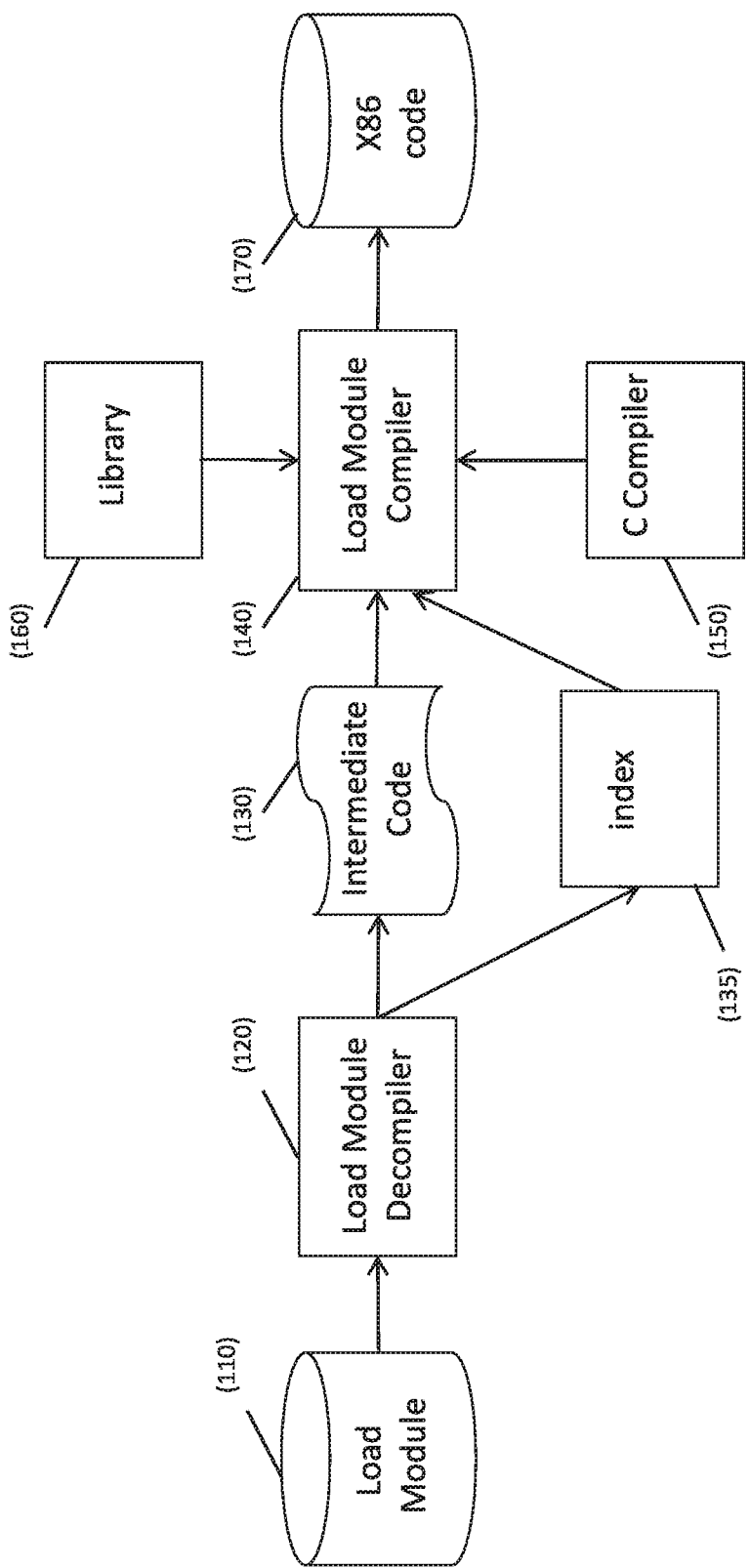
FIG. 1 is a schematic diagram of a system for executing a program compiled for a source architecture on a machine having a different target architecture.

In the example depicted in FIG. 1, a relocatable load module (110) includes a Cobol load module compiled to run on a System 390 or z/OS mainframe computer. In one embodiment, the Cobol load module is compiled to run on a processor supporting a 32-bit instruction set. The load module is first processed by a load module decompiler (120), which may be a mainframe resident facility that decompiles the load module into an intermediate code representation (130). The decompiler also constructs an index (135) of the symbols in the load module that may be externally referenced addresses. Alternatively, the load module may be exported to a non-mainframe platform, and the load module decompiler (120) may be implemented as an application running on that platform, and the load module could be exported to the non-mainframe platform for decompilation by the load module decompiler (120). In one embodiment, the intermediate code representation (130) generated by decompiling the load module is a file or set of files structured such that each instruction of the Cobol load module is represented by a macro in accordance with the rules of the C programming language. Other intermediate code representations (130) may be used. In one embodiment, the intermediate code representation (130) of the load module is received by a load module compiler (140) executing on an appliance, which may be an X86 platform that supports a 64-bit instruction set. A C compiler (150) is invoked by the load module compiler (140) to translate C macro instructions into 64-bit X86 instructions. The load module compiler (140) incorporates the index (135) into the output machine language program so that the external references to memory locations of the executable output program may be resolved. The load module compiler (140) may also invoke a library (150) of operating system functions to translate operating system function calls into native X86 instructions. The load module compiler (140) converts the intermediate code representation (13) into an X86 machine language program that is assembled into an executable file (170). Alternatively, in accordance with the invention, the load module compiler (140) could generate executable code for an alternative 64-bit machine.

In accordance with one embodiment, a decompilation module receives as input a relocatable object program for a first computer architecture and converts the object program into an intermediate representation. In one embodiment, the intermediate code representation constitutes a set of C programming language macros. In one embodiment, the decompilation module recognizes calls to system functions and identifies associated instructions that set up the parameters used by the system functions. In this example, a C program macro may be generated for each mainframe computer function or runtime library invocation. Alternatively, functions could be translated into function calls, but such an intermediate representation is more difficult to optimize. In another alternative, the intermediate code representation (130) could constitute a linear, three-address code format, which is an elementary representation of the program in which program statements are represented in basic blocks that are executed in sequence without branching. Therefore, the output of the load module decompiler (120) is an intermediate code representation (130) of the original relocatable object file.

A symbol table is a data structure that is often used by a compiler to store information about constructs found in a computer program. Typically, symbol tables contain a string identifier (lexeme) associated with each symbol, the type, storage address, and other information pertaining to the symbol. In a typical forward compiler, a symbol table is used in the analysis phase of the compiler to store information from declarations of program constructs. Symbol tables are also used by compilers in the synthesis phase to generate target code. In some cases, a single hash table may be used to contain the symbol table in a data structure that provides for constant time lookups of symbol information by the compiler. In the case of a 32-bit compiler, the compiler operates as if it has a 32-bit addressable memory space, and generates symbol addresses at offsets defined in that 32-bit address space. Similarly, in the case of a 64-bit compiler, the compiler operates as if it has a 64-bit addressable memory space, and generates symbol addresses at offsets defined in that 32-bit address space. Thus, if a program is compiled or recompiled using a 64-bit compiler, the object code output by the compiler will be machine code that uses 64-bit addresses.

In accordance with one aspect of the inventive system, in addition one or more symbol tables, the decompilation module (120) constructs an index of externally referenced program addresses. In particular, the index preferably includes externally referenced addresses, and addresses that are potentially externally referenced. In the case of a 32-bit relocatable load module, those program constructs that are recognized as addresses that may be externally referenced are stored in the index. Preferably, the index entries are assigned to a range of 32-bit numbers whose corresponding addresses in the 64-bit target address space are not allocated, such that the use of such 32-bit numbers as addresses invokes an exception handler. In one embodiment, the index is assigned to the lowest 16 k range of addresses in the 64-bit address space, ranging from 00 00 00 00 00 00 00 00h to 00 00 00 00 00 00 3F FFh. However, larger ranges of addresses, or addresses at a different offset that will be recognized as illegal addresses may also be used.

In one embodiment, a decompiler module (120) makes multiple passes through a an input load module to generate an index of all symbols that could be externally referenced 32 bit addresses. Upon subsequent compilation by a load module compiler module (140), this index of externally referenced addresses (or potentially externally referenced addresses), rather than a set of 64-bit addresses that would otherwise be assigned by the compiler, is combined into the recompiled program.

In one embodiment, the decompiler module (120) performs a first pass through the code of the relocatable Cobol load module during which it addresses control blocks, such as the Task Global Table (TGT) and Program Global Table (PGT), which contain information useful for navigating around the module. Additionally, the first pass of the decompiler module (120) operating in accordance with this embodiment establishes whether the program is reentrant or non-reentrant. If the program is reentrant, the decompiler module saves the address of the program's dynamic initialisation routine.

A set of Binder APIs is described in IBM publication MVS Program Management: Advanced Facilities, SA22-7744-14. These APIs can be used to obtain information regarding the structure and organization of the Cobol load module in accordance with one embodiment of the decompiler module (120). For example, the _iew_create list API creates file and exit lists for use by the _iew_openW function. The _iew_openW function opens a Binder session and returns a context to identify the session that is used by other API calls. The _iew_setO API sets Binder options, such as acceptable return code levels. The _iew_get_reason_code API provides a reason code in the event of a non-zero return code from any other function call. The _iew_includeName API includes a load module or program object inot the Work Module for a Binder session. The _iew_loadW API loads the work module into main storage. The _iew_bindW call binds the Work Module making it ready to be executed by relocating addresses and resolving external references. The _iew_getN API returns a count of CSECTs and a list of CSECT names within the Work Module. The _iew_getD API returns Returns data associated with each CSECT. Depending on usage, this may be the CSECT size, a list of Relocation Dictionary (RLD) entries, or a language entry which identifies the compiler which produced the CSECT. The _iew_getE API returns a list of External Symbol Dictionary (ESD) entries for each CSECT. The _iew_closeW API closes the Binder section. These Binder APIs can be used without changing the Work Module in any way. In accordance with one embodiment, the decompiler module invokes these Binder APIs to obtain information about the Cobol load module used to decompile the module.

If the code is not reentrant, the first pass of the decompiler module (120) then proceeds to examine forward branch addresses to build a list of labels and indexes. Branch instructions will typically be mapped to their branch relative equivalents in the decompiled code, and the branch targets will correspond to labels. However, when the input program code indicates that the address of an instruction is to be loaded into a general purpose register, the address is converted into an index entry. The PERFORM instruction is an example of an instruction generated by the Cobol compiler that loads such addresses into a general purpose register. Other instructions that load addresses into a general purpose register are also recognized by the decompiler module (120), and the corresponding addresses are converted into index entries.

In accordance with one embodiment, a second pass of the decompiler module (120) operates as an extension of the first pass, performing the same functions but with the benefit of the information necessary to process backward branches.

In one embodiment of the decompiler module (120), the third pass generates a copyright notice, a time stamp, and if the program is reentrant, it generates code for the dynamic initialization routine.

The third pass of the decompiler module (120) generates a copy of the intermediate code representation (130) of the input load module, so that addresses identified within the module as indexes can be altered as such. External Symbol Dictionary (ESD) entries are processed and added as external references where necessary. Because the relative addresses within the load module are relocated during the load process to virtual storage addresses, these addresses must be reset as relative addresses. Similarly, Relocation Dictionary (RLD) entries are processed; relocated relative addresses are un-relocated, and addresses which are identified as indexes are replaced by the corresponding index number. In one embodiment, all of the modified data and instructions in the output module are then inserted into a macro called MOD_DATA for subsequent processing by the load module compiler, as seen in FIG. 3.

Non-reentrant Cobol load modules include both the instructions and data within the load module. Reentrant Cobol programs include a dynamic initialization routine to permit data to be allocated at initialization, thus permitting multiple executions of the same load module to each have their own data.

If the program includes a dynamic initialization routine, the decompiler module assigns such routine to index value 1. The start of the program, which is identified by the unique label/index "start" is assigned index value 1 or 2, depending on the existence of the dynamic initialization routine. In one embodiment, RLD entries are then listed in another macro called MOD_RLD4 as illustrated in FIG. 4. The entries in this macro that have been replaced by indexes are listed as comments, as indicated by exemplary the entry /*0x 00004C*/ as shown.

If the dynamic initialization routine exists, its name is specified in another macro. In one illustrative embodiment, this macro titled MOD_SUB. All remaining index entries, excluding that for the dynamic initialization routine, are then listed in a macro called MOD_LBL, as illustrated in FIG. 5. This enables the load module compiler to map index labels positioned in the code.

Pass three of the decompiler module continues on to generate the C macro code corresponding to the z/Architecture machine instructions. As mentioned previously, machine instructions are generally mapped one-to-one onto C macros in the intermediate code representation (130). Preferably, machine instructions that call external routines, such as Language Environment calls, COBOL runtime functions, or other user application modules are not mapped in this way. Instead, these external calls are replace by code to invoke native APIs. The intermediate code representation (130) together with the index (135).

In one embodiment, the load module compiler (140) includes a scripted set of macros that process the intermediate code representation (130) and index (135), including invoking the C compiler (150) and library (160) to generate x86 object code that is assembled into executable x86 code (170). A macro in the load module compiler (140) translates the list of index labels of FIG. 5 into an array of x86 address entries corresponding to each index label. This array of index values may be used at runtime, as described below, to translate external references made by other programs, into the correct x86 address in the compiled x86 code (170). In one embodiment, the first entry in the array corresponding to label zero is equated to an invalid address for purposes of error detection.

Figure 2:
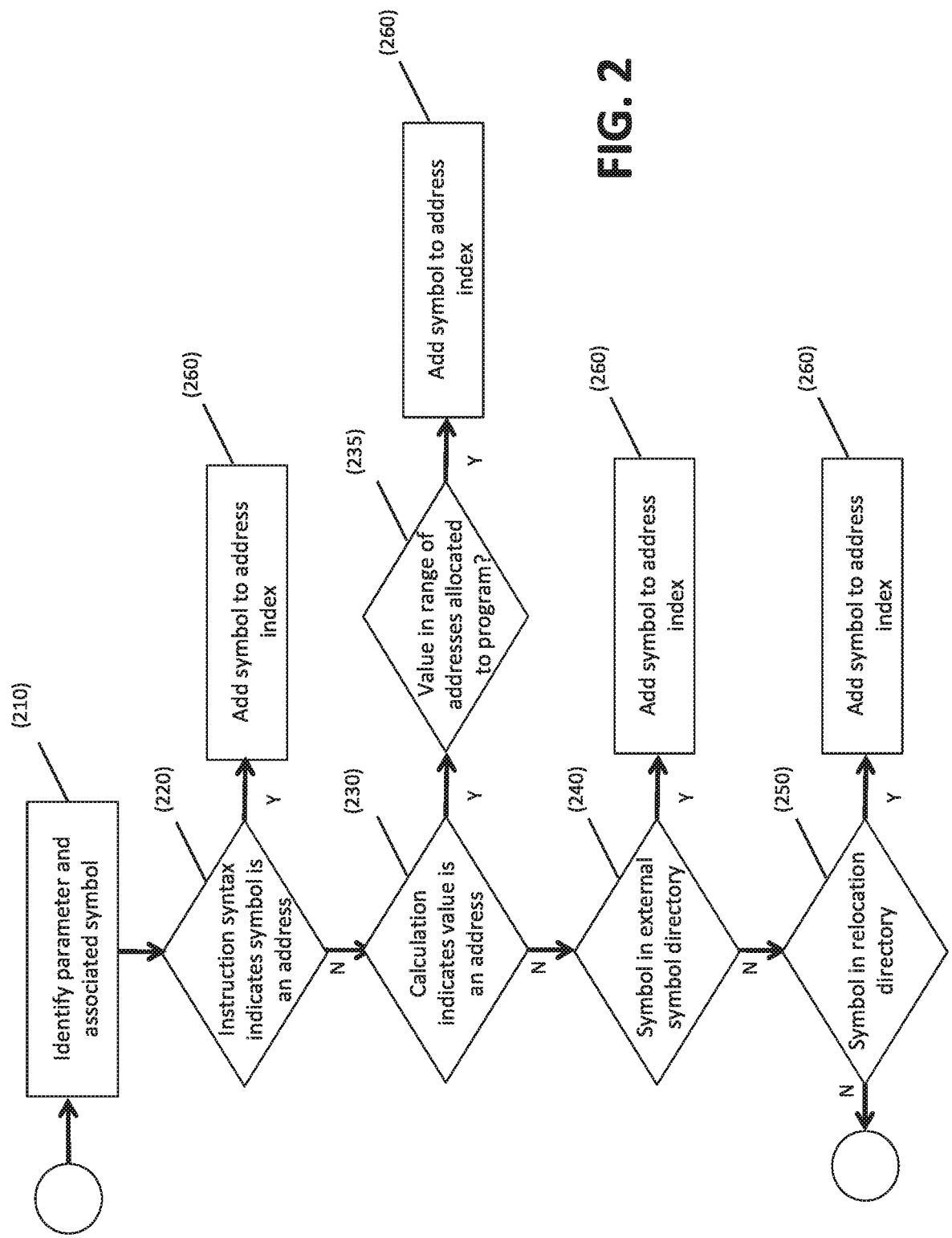
FIG. 2 is a flowchart of a method for executing a program compiled for a source architecture on a machine having a different target architecture.

The embodiment of the decompiler module described above may be further understood with reference to FIG. 2. FIG. 2 illustrates logically how the decompiler module (120), by making multiple passes through the code, identifies addresses that should be included in the index (135) rather than compiled to 64-bit addresses. In one pass through the code, the decompiler module (120) identifies each parameter and associated symbol (210), and performs a series of checks to determine whether the symbol should be added to the index. The decompiler module (120) examines the syntax of the instruction (220), and if the syntax of the instruction indicates that the symbol is an address, the address is added to the index (260). Next, the decompiler module examines symbol values that are calculated, and evaluates whether the manner of calculation of the parameter indicates that the symbol is an instruction address (230). For example, where a parameter is computed by adding an address offset to an integer value, such calculation indicates that the parameter is an address. Where the symbol is determined to be an instruction address, the decompiler module (120) evaluates whether the address falls within the range of addresses allocated to the program (235), and if the address is within this range, the symbol is added to the index (260). During the initial pass through the code, branch targets are identified so that branch targets to instruction addresses may also be added to the index on a subsequent pass.

In a third pass through the input load module, the decompiler module (120) determines whether the symbols are found in the external symbol directory (240). If found in the external symbol directory, the symbols are added to the index (260). Then, the decompiler module determines whether the remaining symbols are found in the relocation directory. If a symbol found in the relocation directory (250), then the decompiler module places (160) that symbol in the index (135). Symbols that are not placed in the index are decompiled.

The logical description of FIG. 2 is illustrative of how a decompiler module operating using the inventive concept may produce an index (135). Other sequencing of the steps to determine those addresses which are or could be externally referenced addresses could also be used.

After decompilation, the intermediate code representation (130) and index (135) are provided to a load module compiler module (140), which translates the intermediate code into x86 code (170), including not only translation of the C macro instructions of the intermediate code representation (130), but also calls to native APIs of the runtime environment written to optimize performance of certain external calls. Preferably, the APIs of the runtime environment are written to support invocation by x86 code (170) generated by the load module compiler, and by an emulator. In one embodiment, input load modules that are not suitable for decompilation by the decompiler module (120) are provided as input to the emulator to enable the legacy load module to run on the x86 platform, albeit with lower performance than in the case of decompilation by the decompiler module (120) and subsequent compilation by the load module compiler module (140).

When the compiler module (140) converts the intermediate code representation (130) into object code including x86 instructions that are assembled into an x86 executable program (170), the entries in the index (135) corresponding to the 32-bit addresses in the address index (135) are inserted into the object code generated by the compiler module (140) rather than inserting 64-bit addresses of the target architecture for those entries. The entries in the table are not given an absolute address, but are assigned an external reference which a linker may then assign to 64-bit addresses allocated to the compiled program. In one embodiment, index location zero is reserved as invalid, and the index of externally referenced addresses begins at location one.

Figure 6:
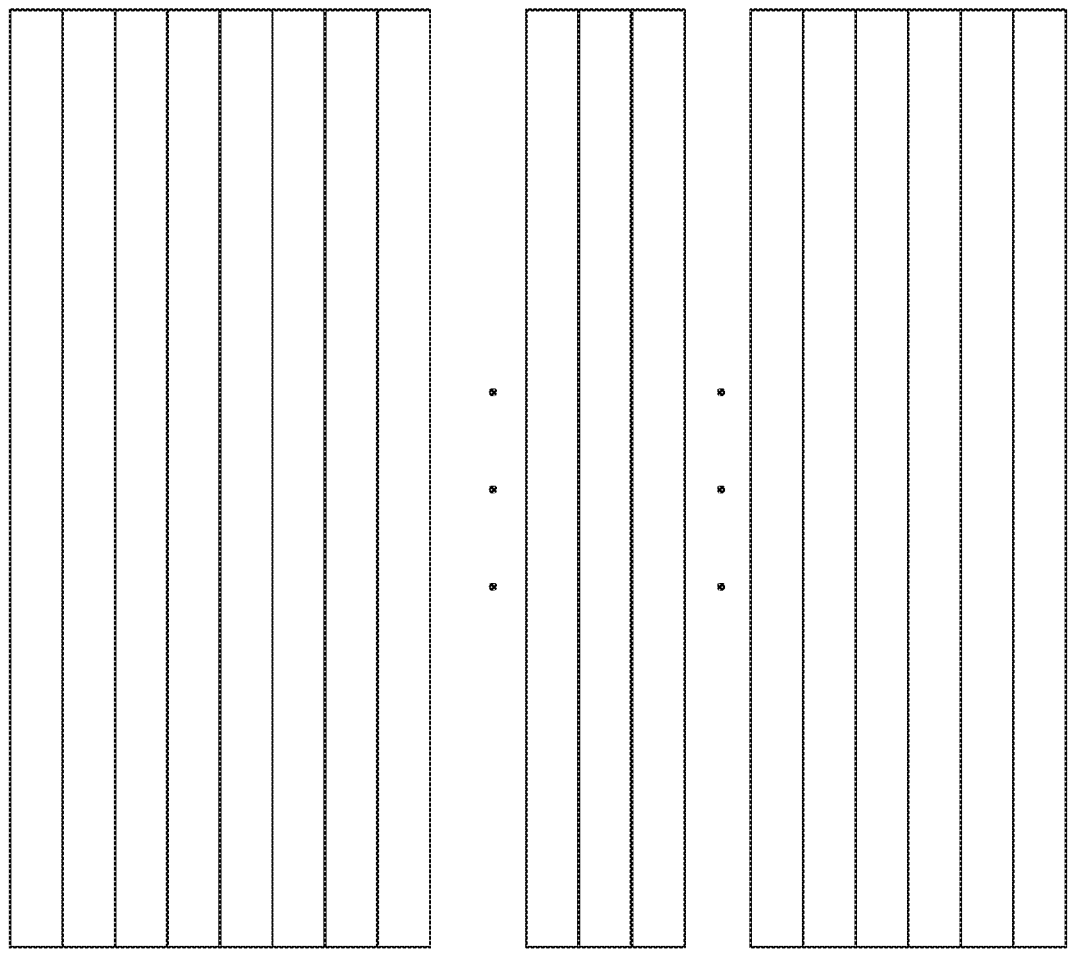
FIG. 6 is a schematic diagram of a 64-bit address space in a system according to FIG. 1, with the lowest portion of the address space corresponding to 32-bit numbers ranging from 0000 0001 0000 0000x down to 0000 0000 0000 0000x.

In operation, if the x86 executable program (170) refers to an indexed address, the runtime system uses the index to identify the 64-bit address of the corresponding instruction. However, a 32-bit program that has not been recompiled may still generate a 32-bit address. FIG. 6 depicts a 64-bit address space, with the lowest portion of the address space corresponding to 32-bit numbers ranging from 0000 0001 0000 0000x down to 0000 0000 0000 0000x. When a program attempts to execute an instruction at an address in this lowest portion of the address space, an exception is generated and an exception handler performs the necessary address translation as explained below.

An important function of the Memory Management Unit (MMU) is to prevent a process or task from executing instructions in memory that has not been allocated to that process or task. An attempt to execute instructions in memory that has not been allocated results in a hardware fault, which is intercepted by the operating system, often called a segmentation fault (SEGV), which causes generally termination of the process. In an embodiment implemented on an x86 machine running an instance of the Linux operating system, the MMU of the processor responds to an attempt to access instructions at these lowest addresses that have not been allocated to the user space of the program and causes the Linux operating system to generate a SEGV signal that invokes an exception handler. In one embodiment, the exception handler is configured to access the index of 32-bit addresses, and to translate the 32-bit address into the corresponding 64-bit address used by the executable program. The exception handler may also be configured to perform additional verifications, such as to support protection key management of memory addresses. One may use the exception handler and prefixing schemes described in PCT application PCT/IB2015/059646 titled "Protection Key Management and Prefixing in Virtual Address Space Application."

In one exemplary embodiment, for which there were fewer than 16 k addresses that were potentially externally referenced, the external memory references will be to addresses ranging from 0000 0000 0000 0000x to 0000 0000 0000 3000x, as depicted in FIG. 7. Because this range of addresses is not assigned to the program, an attempt to execute an instruction at these locations will invoke the MMU and exception handler, which will determine the correct address and then retry the instruction at the proper address.

In addition to the use of the exception handler, as a further optimization, the load module compiler (140) may insert into its output executable x86 code (170) instructions that recognize that an address is an invalid address, and to perform a lookup on the index to substitute a valid address for the x86 executable code. In this case, the index may have been embedded in the x86 executable code. This optimization can be used to avoid the overhead associated with context switching to invoke the exception handler each time an externally referenced address appears in the x86 executable code generated by the compiler module (140). In one embodiment, an input output macro is invoked for input output (IO) instructions, and the load module compiler (140) inserts a compare instruction to determine whether the branch target of an input output routine is an invalid address corresponding to the invalid addresses used for the index. Additionally, the load module compiler inserts instructions to perform a lookup of the x86 address corresponding to the invalid address using the index. By way of this optimization, the overhead associated with invoking the exception handler is avoided for branch targets of input output routines. The load module compiler (140) could be adapted to perform a similar optimization for other frequently occurring instructions that invoke potentially externally referenced addresses. In one embodiment, the use of the of this optimization with the load module compiler produced nearly a six-fold increase in operating system performance for a COBOL job that ran using 358.512 seconds of CPU time without the optimization, and ran in 61.125 seconds using the optimization.

The load module compiler permits the execution of a natively x86 program derived from a legacy executable program or programs. In one example, the programs including the COBOL85 test suite of the National Institute of Standards and Technology "NIST" were initially compiled using the COBOL version 4 compiler to produce 5390 executable code. After decompiling the compiled programs of the NIST test suite, to generate the intermediate file format and index, and after subsequently compiling the intermediate files into x86 program instructions using the compiler module, the x86 code generated by the compiler module produced identical program output when compared to the program output of the 5390 executable code.

In another example, an executable load module compiled using the COBOL version 4 compiler was run on an emulator adapted to allow for the execution of the legacy program on an x86 computer. In this example, the emulator executed between 200 and 300 instructions on the emulator for each native instruction in the original executable program. When the executable load module was transformed using the decompiler module and compiler module described above into an x86 executable, the x86 executable file executed 8 to 9 instructions for each original native instruction. Due to the substantial reduction in the number of executable instructions required to execute the natively compiled program, significant performance gains can be achieved using the load module compiler of the present invention, particularly for processor bound workloads.

In another example, a load module executed using the load module compiler of the present invention achieved more than a ten-fold improvement in system performance when compared to execution of the same program on an emulator. In one example of a CPU-intensive COBOL program running on an IBM z10 model 2098-A02 rated for 6 MSU under z/OS 1.13, the program executed in 19 minutes 28 seconds of elapsed time, using 16 minutes of CPU time. In emulation, running the same COBOL program on a Dell PowerEdge R730xd, having 2 CPU sockets, 16 physical cores per socket, Intel® Xeon® CPU ES-2698 v3 at 2.3 GHz under Red Hat Enterprise Linux 7.1, the same COBOL program took three minutes and fifty-eight seconds elapsed and three minutes and fifty-nine seconds of total CPU time among the cores. Running the same COBOL program using the load module decompiler and load module compiler described herein, the program ran in exactly one minute using one minute of CPU time. Thus, in the example of this job, the load module compiler produced nearly a seventeen-fold performance increase over the legacy machine, and nearly a four-fold increase over the execution of the job in emulation.

The examples of the decompiler module (120) and the compiler module (140), the library (160), C compiler (150) and runtime environment including the interrupt handler may be stored in a non-transitory storage medium. The decompiler module (120) may be installed on a first platform, such as a legacy computer system, or may be installed on a different platform, which may be the exemplary x86 platform on which the compiler module (140), library (160), C compiler (150) and runtime environment are installed. Alternatively the various parts of the system may distributed on multiple platforms within the spirit of the invention described herein. Where more than one platform is used to install and operate the different parts of the inventive system, the different platforms are coupled by way of a computer network, which may include wired, optical, or wireless local area networks, wide area networks, satellite or other telecommunications networks. In operation, the system may be loaded from a non-volatile storage medium such as a disk, tape, hard drive, flash memory drive, or other non-volatile storage medium, such that portions or all of the components of the system are simultaneously resident in the volatile memory of the one or more computers that make up the system.

Many examples are provided herein. These examples may be modified without departing from the spirit of the present invention. The examples and embodiments described herein are offered as examples, and other components, routines, or modules may also be used.

The invention claimed is:

1. A computer implemented method for executing a first program compiled for a source architecture on a machine having a target architecture different from the source architecture, the method comprising:

receiving by a processor said first program comprising first executable code compiled to execute on a source architecture;

decompiling a load module of the first program into intermediate computer code formatted according to an intermediate code format;

identifying a set of addresses that are exposed for external reference by a second program compiled to execute on the source architecture;

storing in a computer memory an index of said set of addresses that are exposed for external reference, wherein the index comprises values that correspond to invalid addresses in the target architecture;

recompiling the intermediate computer code into target executable code configured for the target architecture;

incorporating the index of said set of addresses into the target executable code; and executing said target executable code on a processor having said different target architecture, wherein said executing generates at least one invalid address and said invalid address is translated into a valid address using the incorporated index in the target executable code.

2. The method of claim 1 wherein the receiving by a processor said first program is performed by a processor of said source architecture.

3. The method of claim 1 wherein the receiving by a processor said first program is performed by a processor of said target architecture.

4. The method of claim 3 wherein the receiving by a processor said first program is performed by a first processor of said target architecture, and the recompiling is performed on a second processor of said target architecture.

5. The method of claim 1 wherein said intermediate computer code formatted according to an intermediate code format invokes an input output macro, further comprising:

inserting one or more instructions into the target executable code to determine that a branch target is directed to an invalid address; and inserting instructions to replace such invalid address with a valid address at runtime using the incorporated index in the target executable code.

6. The method of claim 1 wherein the set of addresses that are exposed for external reference are 32-bit addresses and the at least one invalid address in the target architecture is a 64-bit address.

7. The method of claim 1 wherein said first program is a relocatable Cobol load module.

8. The method of claim 1 wherein the intermediate computer code formatted according to an intermediate code format comprises a set of C program macros.

9. The method of claim 1 wherein said identifying the set of addresses that are exposed for external reference comprises, in a first pass, examining syntax of instructions in machine code of said first program, determining from the syntax of the instructions that a set of symbols are addresses, and adding the symbols to the index.

10. The method of claim 9 wherein the identifying the set of addresses that are exposed for external reference further comprises identifying parameters in the machine code whose calculation indicates that the parameters are addresses within a range of addresses allocated to the first program, and adding the symbols corresponding to each such parameter to the index.

11. The method of claim 10 wherein the identifying the set of addresses that are exposed for external reference further comprises identifying symbols located in an external symbol directory, and adding the symbols corresponding to such symbols to the index.

12. The method of claim 11 wherein the identifying the set of addresses that are exposed for external reference further comprises identifying symbols located in a relocation directory, and adding the symbols corresponding to such symbols to the index.

13. A non-transitory computer readable medium configured to store instructions, the instructions when executed by one or more processors cause the one or more processors to execute a first program compiled for a source architecture on a machine having a target architecture different from the source architecture by performing steps comprising:

receiving by a processor said first program comprising first executable, code compiled to execute on a source architecture;

decompiling by a decompiler module executing on the processor a load module into intermediate computer code formatted according to an intermediate code format;

identifying by the decompiler module a set of addresses that are exposed for external reference by a second program compiled to execute on the source architecture:

storing in a computer memory an index of said addresses that are exposed for external reference, wherein the index comprises values that correspond to a range of invalid addresses in the target architecture;

recompiling by a compiler module the intermediate code into target executable code configured for the target architecture, wherein the compiler module incorporates the index of said addresses into the target executable code; and executing said target executable code on a processor having said different target architecture, wherein said executing generates at least one invalid address and wherein an exception handler translates said invalid address into a valid address using the incorporated index.

14. The non-transitory computer readable medium of claim 13 wherein said intermediate code formatted according to an intermediate code format invokes an input output macro, and wherein the compiler module inserts one or more instructions into the target code to determine that a branch target is directed to an invalid address and instructions to replace such invalid address with a valid address at runtime using the incorporated index.

15. The non-transitory computer readable medium of claim 13 wherein the set of addresses that are exposed for external reference are 32-bit addresses and the at least one invalid address according to said target architecture is a 64-bit address.

16. The non-transitory computer readable medium of claim 13 wherein said first program is a relocatable Cobol load module.

17. The non-transitory computer readable medium of claim 13 wherein the intermediate code formatted according to an intermediate code format comprises a set of C program macros.

18. The non-transitory computer readable medium of claim 13 wherein said identifying by the decompiler module the set of addresses that are exposed for external reference comprises, in a first pass by the decompiler module, examining the syntax of the instructions in the machine code of said first program, determining from the syntax of the instructions that a set of symbols are addresses, and adding the symbols to the index.

19. The non-transitory computer readable medium of claim 18 wherein the identifying by the decompiler module the set of addresses that are exposed for external reference further comprises identifying parameters in the machine code comprising said first program whose calculation indicates that the parameters are addresses within a range of addresses allocated to the first program, and adding the symbols corresponding to each such parameter to the index.

20. The non-transitory computer readable medium of claim 19 wherein the identifying by the decompiler module the set of addresses that are exposed for external reference further comprises identifying symbols located in a relocation directory, and adding the symbols corresponding to such symbols to the index.

21. A system for executing a first program compiled for a source architecture on a machine having a target architecture different from the source architecture, the system comprising:
    a first platform comprising one or more processors of a source architecture;
    a decompiler installed on the first platform and configured to execute on a processor of the one or more processors of said source architecture, the decompiler adapted to:
        receive said first program comprising first executable code compiled to execute on a source architecture;
        decompile a load module of the first program into intermediate computer code formatted according to an intermediate code format;
        identify a set of addresses that are exposed for external reference by second program compiled to execute on the source architecture; and
        store in a computer memory an index of said set of addresses that are exposed for external reference, wherein the index comprises values that correspond to invalid addresses in the target architecture;
    a second platform, comprising one or more processors of a target architecture, Wherein the second platform is coupled to the first platform through a computer network;
    a compiler installed on the second platform adapted to execute on a processor of the target architecture, the compiler adapted to receive the intermediate computer code and the index generated by the decompiler, to compile the intermediate code into an executable program of the target architecture comprising machine code of the target architecture, and to incorporate the index of the set of addresses into the executable program of the target architecture; and
    an exception handler installed on the second platform wherein, in response to detection by a processor of the second platform of the execution of an instruction to access an invalid address said exception handler translates said invalid address into a valid address using the incorporated index in the executable program of the target architecture.

* * * * *

UNITED STATES PATENT AND TRADEMARK OFFICE
CERTIFICATE OF CORRECTION

PATENT NO. : 11,354,103 B2
APPLICATION NO. : 16/920998
DATED : June 7, 2022
INVENTOR(S) : Jan Jaeger et al.

It is certified that error appears in the above-identified patent and that said Letters Patent is hereby corrected as shown below:

In the Claims

Column 14, Claim 13, Line 17:
"first executable, code compiled" should read: --first executable code compiled--.

Column 14, Claim 13, Lines 25-26:
"architecture:" should read: --architecture;--.

Column 14, Claim 13, Line 31:
"compiler module the intermediate" should read: --compiler module, the intermediate--.

Column 16, Claim 21, Line 2:
"reference by second program" should read: --reference by a second program--.

Column 16, Claim 21, Line 10:
"architecture, Wherein the" should read: --architecture, wherein the--.

Column 16, Claim 21, Line 25:
"invalid address said exception" should read: --invalid address, said exception--.

Signed and Sealed this
Nineteenth Day of March, 2024

Katherine Kelly Vidal
*Director of the United States Patent and Trademark Office*